United States Patent [19]

Dörfel et al.

[11] 4,125,076
[45] Nov. 14, 1978

[54] POSITIONING DEVICE FOR CARRIAGES MOVABLE ALONG A GUIDE

[75] Inventors: Gerhard W. Dörfel; Bernd D. Görner, both of Weilheim, Teck, Fed. Rep. of Germany

[73] Assignee: A. Ahlstrom Osakeyhtio, Finland

[21] Appl. No.: 618,833

[22] Filed: Oct. 1, 1975

Related U.S. Application Data

[63] Continuation of Ser. No. 500,670, Aug. 26, 1974, abandoned, which is a continuation-in-part of Ser. No. 448,509, Mar. 6, 1974, abandoned.

[51] Int. Cl.$^2$ ............................................. B61B 13/00
[52] U.S. Cl. ...................................... 104/165; 188/67; 83/499; 83/504; 92/65; 92/69 R
[58] Field of Search ............... 198/19/20 R, 218, 472, 198/747; 83/499, 504; 104/169, 172 BT, 88, 172 S, 147 K, 165; 92/65, 69 R; 188/67

[56] References Cited

U.S. PATENT DOCUMENTS

| | | | |
|---|---|---|---|
| 3,055,313 | 9/1962 | Stoll et al. | 198/218 |
| 3,785,475 | 1/1974 | Maynard | 198/19 |
| 3,786,705 | 1/1974 | Dorfel | 83/504 |
| 3,834,258 | 9/1974 | Zumstein | 83/504 |

FOREIGN PATENT DOCUMENTS 1,176,006 8/1964 Fed. Rep. of Germany ............... 92/65

Primary Examiner—Joseph E. Valenza
Attorney, Agent, or Firm—Bucknam and Archer

[57] ABSTRACT

A positioning device for transferring a plurality of carriages or the like into desired positions along a guide, and for holding the carriages in said positions, said device having at least one transfer bar extending along the guide and being movable reciprocally within certain end positions and each carriage having a locking mechanism which, in one condition, locks the carriage to the transfer bar for movement therewith and, in another condition, locks the carriage to the guide, wherein said locking mechanism comprises two pistons movable axially in relation to each other and provided with means for engagement with the guide and with the transfer bar respectively, a pressure medium channel leading to a space between said pistons and one of the pistons being provided with spring means so that with no pressure medium applied said one piston is forced into engagement by the spring force while, upon application of pressure between the pistons, said one piston is released and the other piston forced into its engagement position.

5 Claims, 3 Drawing Figures

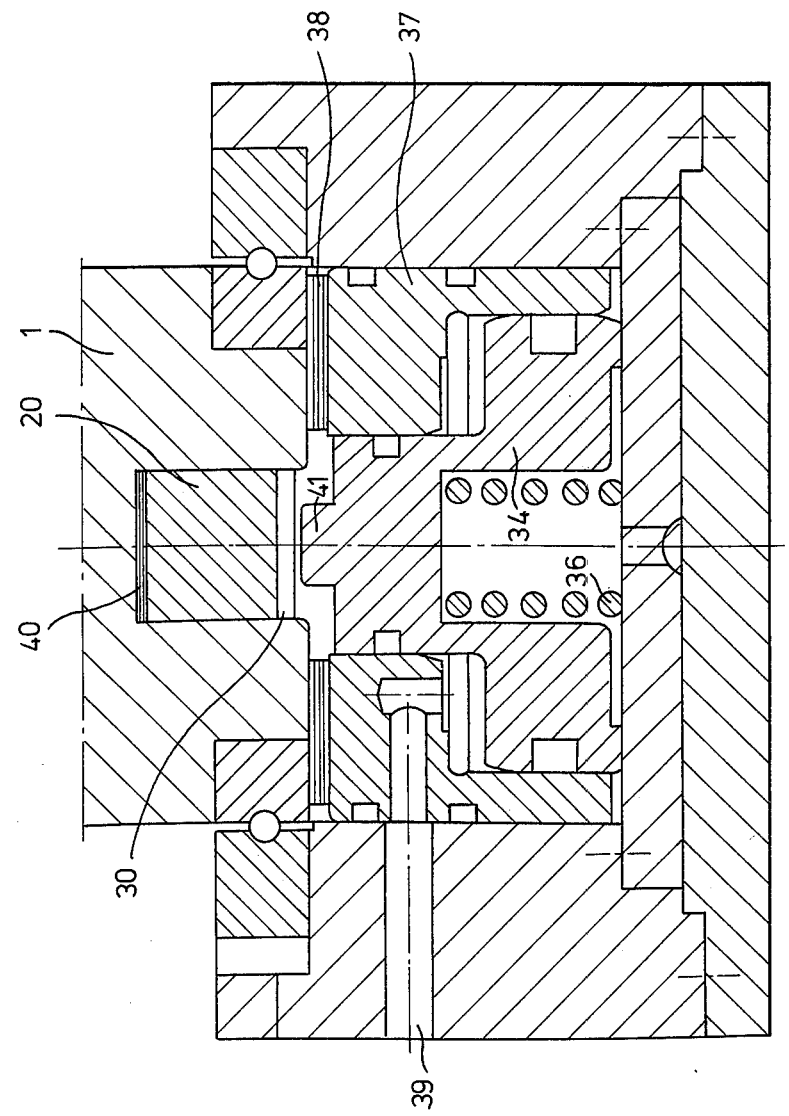

POSITIONING DEVICE FOR CARRIAGES MOVABLE ALONG A GUIDE

CROSS-REFERENCE TO RELATED APPLICATIONS

This application is a continuation of our application Ser. No. 500,670, filed Aug. 26, 1974, now abandoned which was a continuation-in-part of our application Ser. No. 448,509, filed Mar. 6, 1974, now abandoned.

BACKGROUND OF THE INVENTION

1. Field of the Invention

The present invention relates to a device for transferring several carriages or the like moving along a guide and for attaching them to predetermined positions, the device being provided with at least one elongate transfer member, such as a bar, moving reciprocally along the guide, and each carriage having a locking member to engage it to the transfer member for the purpose of transfer or to the guide upon reaching its predetermined position.

More specifically, this invention is directed to the locking mechanism included in the apparatus disclosed in the main application.

2. Description of the Prior Art

In known devices where the carriages are moved by means of threaded bars extending along the guides, the carriages are, of course, continuously in engagement with the transfer bars and no locking or releasing need to be provided for. On the other hand, it is known as such to lock a carriage or similar support means to a guide e.g. by using a pressure medium or electromagnetic means.

SUMMARY OF THE INVENTION

The present invention relates to a device of the type disclosed in the main application, wherein the locking mechanism comprises two pressure medium pistons axially movable in relation to each other; gripping means provided at each one of said pistons for engaging one piston with the guide and the other piston with the transfer member, respectively; a pressure medium channel leading to a space between said pistons; and spring loading means forcing one of said pistons into its gripping position when no pressure is applied between the pistons, whereas, upon application of pressure, said one piston is released against the spring force and the other piston is brought into its gripping position by the pressure medium force.

Thus it is an object of the present invention to provide for the positioning device a suitable locking mechanism by means of which the carriage can be locked to the moving transfer member for transferring the carriage and to a stationary guide after the transfer. Another object is that the change of locking take place in a reliable manner by means of one and the same control.

A positioning device according to this invention may be used, for example, for transferring cutting tools to desired positions over the width of a moving web, such as a paper web.

BRIEF DESCRIPTION OF THE DRAWINGS

FIG. 3 shows another embodiment of the locking device.

DESCRIPTION OF THE PREFERRED EMBODIMENTS

Figure 1:
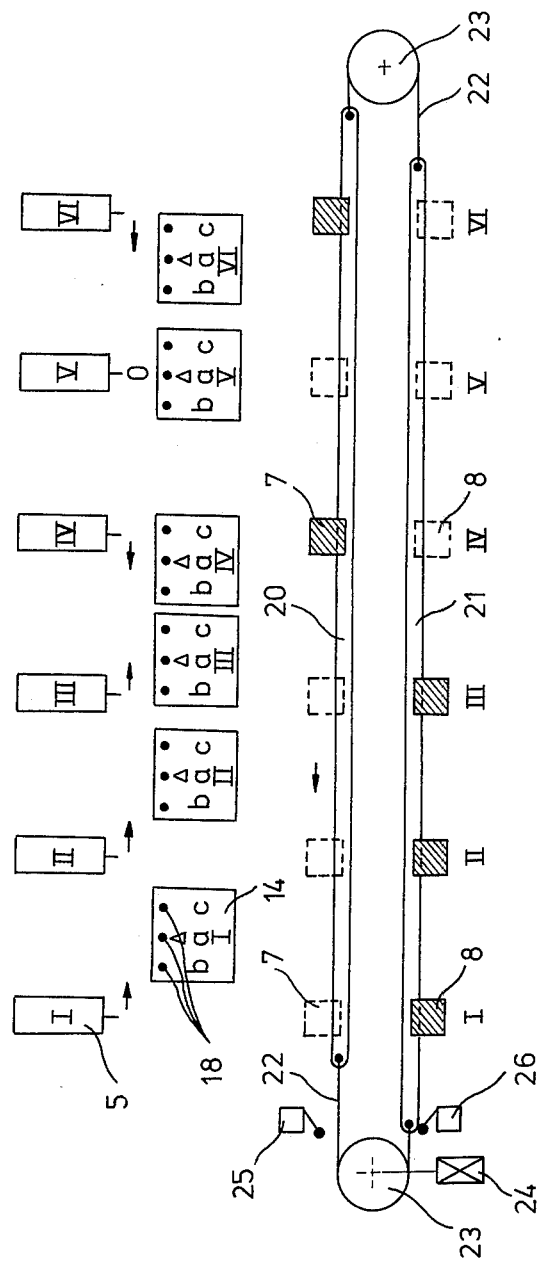
FIG. 1 shows, partly schematically, a side view of a device according to the main application.

In FIG. 1, number 5 refers to carriages or the like moving along a guide (not shown), such as a rail; in, for example, a longitudinal cutter of a paper web the carriages serve as supporters of the cutting blades. The desired positions of the carriages I–VI have been selected by means of pre-selection units 14, which can be transferred along a suitable guide to points selected according to, for example, a scale. The precise, desired final position of a carriage is indicated by contact point 18a, while points b and c delimit the area within which the transfer takes place at a decreased speed. Such a two-stage control, which comprises a rapid rough-control and a slower fine-control, is well known per se.

In the Figure, the arrows indicate the desired transfer direction of each carriage. The transfer members are two bars 20, 21, which are linked together at their ends with ropes or chains 22 running over wheels 23. One of the wheels is driven by a motor 24 so that the limit switches 25 and 26 are actuated by the ends of the transfer bars 20, 21 to cause a change in the direction of movement of the bars so that the bars reciprocate.

Each carriage 5 has two locking members 7, 8 by means of which the carriage can be locked to either bar 20 resp. 21, depending on the desired transfer direction. The locking member is preferably in signal contact with the pre-selection unit so that it detaches the carriage from the bar when the carriage has reached the point 18a. If the "stroke length" of the bar is not sufficient for the transfer of some carriage, arrangements are preferably made to the effect that at the moment of direction-changing both locking members 7 and 8 change their state, whereby the carriage continues to move in the same direction but now with the other bar. In the Figure, a coupled locking member is indicated by cross-hatching, and an uncoupled one by dotted lines.

Figure 2:
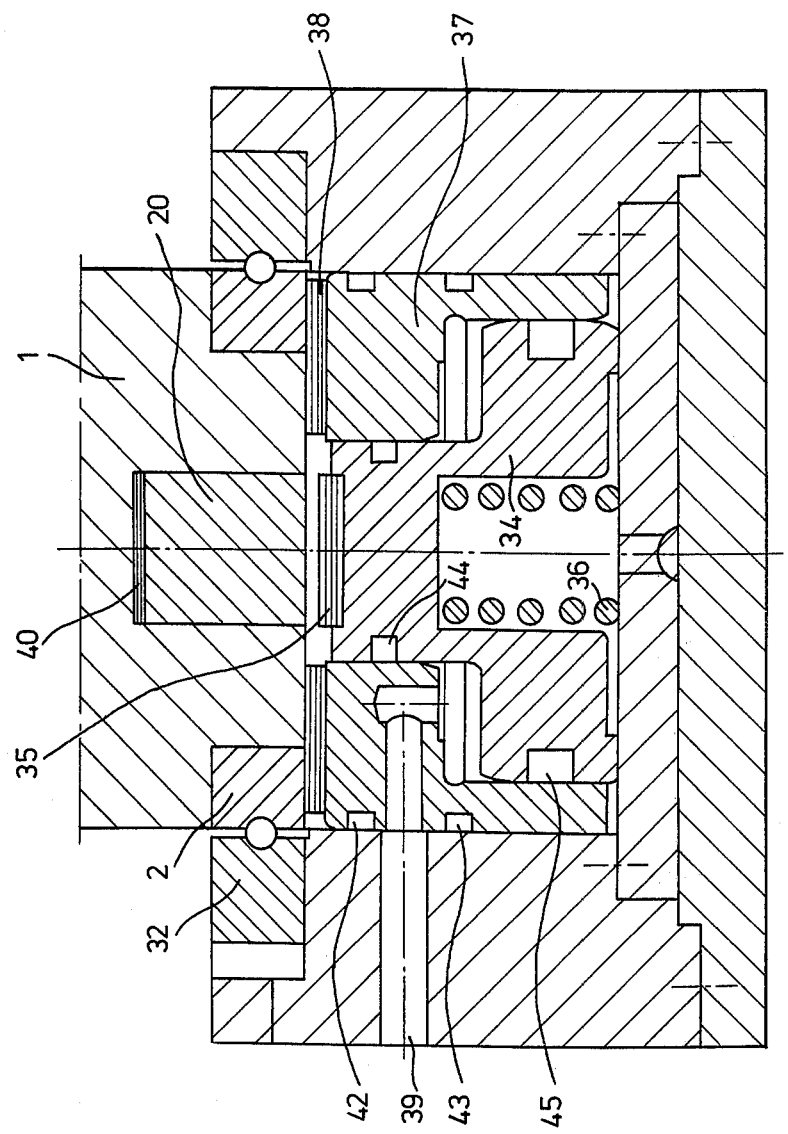
FIG. 2 shows a cross section of an embodiment of the locking device according to the present invention and applicable in the device shown in FIG. 1.

FIG. 2 shows a locking member according to the invention by means of which a carriage can be coupled alternatively to a stationary guide rail or, for the purpose of transfer, to the bar 20. The locking member in the carriage, supported by bearings 2, 32, moves along the rail 1. The locking member has a piston 34 with a brake piece 35 at one end and a spring 36 at the other. The piston 34 has been fitted to move easily in the brake piston 37, the end of which has been provided with a brake cover 38 serving as a friction surface. When pressure medium is pressed between these members, they move simultaneously in opposite directions. Numbers 42–45 indicate the gaskets of the pistons. The transfer bar 20 moves along a groove in the rail 1, the bottom of the groove having been provided with a slide cover 40.

The device works as follows: When pressure medium is fed through the pipe 39, the brake piston 37 with its brake cover is pressed against the rail 1. Simultaneously, the piston 34 moves to a position where it does not touch the surface of the transfer bar 20. If the transfer bar is moving, the carriage 5 is thus detached and stopped under the brake effect.

When the pressure is removed, the spring 36 presses the piston 34 with its brake pieces 35 against the transfer bar. If the transfer bar is moving, the carriage begins to move under the effect of friction.

FIG. 3 shows a similar locking device, wherein the locking to the bar, however, takes place by means of a pin 41 in the piston 34; the pin enters a notch 30 in the bar. Otherwise the locking device is as in FIG. 2. Thus, when the pressure is decreased, the spring 36 presses the pin 40 against the lower surface of the bar 20, along which the pin moves until it reaches and enters a notch 30 and is thereby locked to the bar. In order that the carriage 5 should not move while the transfer bar slides against the end of the pin 40 before the latter enters the notch, a minimum braking force is always set by applying a small, constant pre-pressure with a slightly smaller effect than the spring force of the spring 36. The bar has an appropriate number of notches at regular intervals. The locking member according to FIG. 3 can be used in, for example, a transfer device according to FIG. 5 of the principal patent specification.

What is claimed is:

1. In a positioning apparatus of the type in which a carriage is moveable along a guide member and can be selectively coupled to a moveable transfer member for movement thereby along said guide the improvement which comprises a dual locking mechanism borne by the carriage and having a first locking means and a second locking means both fluid powered, said first locking means being operable to engage the guide member to lock the carriage thereto and said second locking means being operable to engage the transfer member to lock the carriage thereto, said first and second locking means having respective pistons actuated concurrently by a common pressurized fluid medium and disposed such that when the fluid medium is at one pressure condition the first locking means engages the guide member and locks the carriage thereto while the second locking means is held in a released state and out of engagement with the transfer member and when the fluid medium is at another pressure condition the first locking means is set in a released state and disengaged from the guide member to allow movement of the carriage therealong while the second locking means is set into engagement with the transfer member to lock the carriage thereto, said pistons being disposed for relative movement in opposite directions and one piston extending through the other.

2. The improvement according to claim 1 wherein the piston of said second locking means is resiliently biased for locking engagement with the transfer member when the fluid medium is at a given low pressure condition and is held in said released state when the fluid medium is at a given high pressure condition.

3. The improvement according to claim 1 wherein the pistons of said first and second locking means are disposed for relative movement in contact with each other.

4. The improvement according to claim 1 wherein at least one of the pistons of said first and second locking means has a friction part disposed to engage the corresponding one of said guide and transfer members to lock the carriage thereto by frictional engagement.

5. The improvement according to claim 1 wherein the piston of said second locking means has a part disposed to extend into a cavity in the transfer member to lock the carriage thereto by positive engagement.

* * * * *